United States Patent [19]
Andersson et al.

[11] Patent Number: 5,914,413
[45] Date of Patent: Jun. 22, 1999

[54] GAS FILTER UNIT

[75] Inventors: Gunnar Andersson, Borås; Bo Engvall, Jonsered; Bo Lindvert, Brämhult; Göran Ström, Sandared, all of Sweden

[73] Assignee: Scandfilter AB, Svenljunga, Sweden

[21] Appl. No.: 08/930,377

[22] PCT Filed: Mar. 21, 1996

[86] PCT No.: PCT/SE96/00354

§ 371 Date: Oct. 23, 1997

§ 102(e) Date: Oct. 23, 1997

[87] PCT Pub. No.: WO96/29138

PCT Pub. Date: Sep. 26, 1996

[30] Foreign Application Priority Data

Mar. 22, 1995 [SE] Sweden .................................. 9501005

[51] Int. Cl.⁶ .................................................. B01D 29/13
[52] U.S. Cl. .................................. 55/378; 55/491; 55/493; 55/497; 55/500; 55/511; 55/DIG. 12; 55/DIG. 31
[58] Field of Search .............................. 55/378, 483, 484, 55/490, 491, 493, 497, 495, 500, 511, 521, DIG. 31, DIG. 12

[56] References Cited

U.S. PATENT DOCUMENTS

| | | | |
|---|---|---|---|
| 3,099,547 | 7/1963 | Hagendoorn et al. | 55/497 |
| 3,142,550 | 7/1964 | Kuehne | 55/DIG. 31 |
| 5,320,655 | 6/1994 | Ernst | 55/378 |
| 5,342,423 | 8/1994 | Taft | 55/483 |
| 5,476,526 | 12/1995 | Attermeyer | 55/496 |

*Primary Examiner*—Jay H. Woo
*Assistant Examiner*—Robert Hopkins
*Attorney, Agent, or Firm*—Dvorak & Orum

[57] ABSTRACT

The invention concerns a gas filter unit or cartridge type, including a filter material put together to form one or several filter bags, and a support frame of essentially U-shaped cross-sectional configuration, including a web portion and two lateral leg members in adjoining relationship, the filter material closest to the mouths of the filter bags being clamped in position between said lateral leg members. In accordance with the invention, the frame includes profile sections of a flexible material, preferably a plastics material, at least one of said lateral leg members being hingedly interconnected with the web portion, in addition to which locking means are provided to retain the corresponding lateral leg member in its clamping position in which it is pivoted into engagement with the other lateral leg member.

12 Claims, 6 Drawing Sheets

GAS FILTER UNIT

GAS FILTER UNIT

The subject invention relates to a gas filter unit of cartridge type, comprising a filter material put together to form one or several filter bags, and a support frame of essentially U-shaped cross-sectional configuration including a web portion and two adjoining lateral leg members in adjoining relationship therewith, the filter material closest to the mouths of the filter bags being clamped in position between said lateral leg members.

Gas filter units of the type outlined above are known for instance from U.S. Pat. No. 4,056,373. The frame designed to support the filter bags at the mouths thereof usually is either a metal frame having a U-shaped cross-sectional configuration, the lateral leg members or lateral flanges of which are clamped about the material closest to the filter bag mouths, or preferably a frame of a plastics material to which the filter bag and portions are secured by welding by means of a thermoplastic or otherwise hardenable material. This type of securement could also be used in a metal frame. Since the requirements of product recyclability are becoming stricter it is necessary that the various types of material incorporated in a product be easily separated to be subsequently subjected to destruction or recycling in a manner adapted to each individual material. In the case of filter units of the kind outlined above it has hitherto been impossible, or at least entailed considerable difficulties, to separate the support frame from the very filter bag material. In addition, complex equipment is required to insert and secure the filter bag material to the support frame in the manufacture of the filter cartridge.

The main purpose of the invention is to provide a gas filter unit which may be manufactured in a simple and cost-saving manner and which may also be easily separated into its various structural materials in connection with destruction and/or recycling.

This purpose is achieved in accordance with the invention by means of a gas filter unit which is essentially characterized in that the frame comprises profile sections of a flexible material, preferably of a plastics material, at least one of said lateral leg members being hingedly interconnected with the web portion, and in that locking means are provided to retain the corresponding lateral leg member in its clamping position wherein it is pivoted into engagement with the other lateral leg member. Owing to this arrangement the filter bags are easily inserted into the frame part and the frame part may be clamped thereto simply by the lateral leg members being folded inwards, the frame part being efficiently secured to the filter bags following activation of the locking means. By releasing the locking means the frame may be detached from the filter bags in a simple manner and both components be destructed and/or recycled separately.

Preferably, the pivotable lateral leg members and the web portion are integrally interconnected as a unit via a thinner hinge portion. The assembly is thus greatly facilitated because the entire cross-section of the frame pieces consist of captively interconnected pieces.

Preferably, those edge portions of the lateral leg members that face away from the web portion are bent inwards so as to form a filter-material securing nip when in their clamping position. Owing to this bent configuration resilient clamping portions are formed that efficiently retain the filter material, independently of any changes of the shape of the material that may be caused for instance by changes in the environment in which the gas filter unit is used.

Preferably, the locking means are in the shape of hook means formed on respectively the web portion and the lateral leg members and spaced a distance from the respective hinge connection between the web portion and the lateral leg members, said hook means interengaging in the filter-material clamping position. Owing to this arrangement a simple locking device is produced, which owing to its position in relation to the hinge allows the lateral leg members to be efficiently maintained in their clamping position.

Preferably the support frame consists of straight lateral frame pieces and of corner pieces fitted thereto an extending across the frame corners. This allows the various pieces to be manufactured in a simple manner, particularly when the frame side pieces are extruded profile sections.

Preferably, the web portion of the frame side pieces is configured as a hollow section while at the same time the corner pieces have a core formed with insertion tenons fitting the cavity of the hollow section. In this manner interconnection of the various components making up the frame is facilitated.

Preferably, the corner pieces are formed with flap-like lateral leg members formed integrally with and hingedly interconnected with the associated corner piece core on either side of the corner angle, which leg members, like the lateral leg members of the frame side pieces, are arranged to be pivoted inwards to assume a clamping position in which they are retained by interacting hook means formed respectively on the lateral leg members and on the corner piece body corresponding to the web portion of the frame side pieces. Owing to this arrangement it becomes easy to insert the edge portions of the filter bags in the assembled frame along the entire circumference thereof and to efficiently clamp the filter bag material in position along the entire frame. Preferably, one lateral leg member of at least the frame side pieces is formed with a back-up shoulder on which rest filter bag support bars extending between facing frame side pieces. The provision of such a back-up shoulder allows loose support bars to be positioned so as to bridge the space between oppositely positioned frame side pieces, thus efficiently supporting the filter material when the latter is assembled so as to form several filter bags the mouths of which are distributed across the surface of the support frame.

Preferably, the web portions, the lateral leg members, the hook means, the clamping means as well as the support bar back-up shoulders of the frame side pieces all are parts of the cross-sectional configuration of an extruded profile section and thus they extend over the entire length of the corresponding frame side piece. This arrangement results in highly simplified manufacture because all parts included in the frame side piece construction may receive their final configuration already in the very extruding process.

Further advantages of and characteristic features of the invention will appear from the dependent claims.

One embodiment of the invention will be described in closer detail with reference to the accompanying drawings, wherein.

Figure 1:
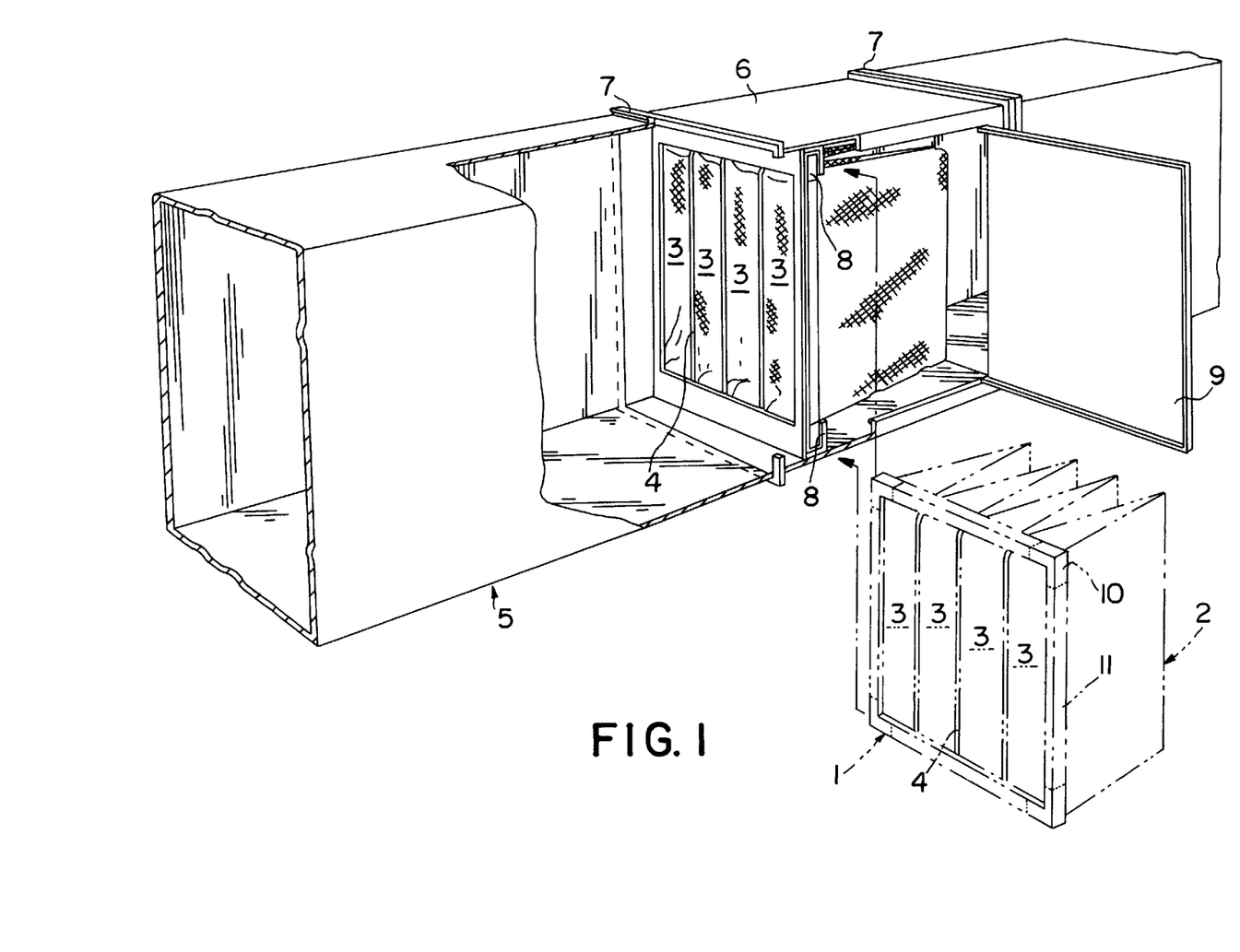
FIG. 1 is a partly cut perspective view of a ventilation duct or the like in which is mounted a gas filter unit in accordance with the invention.

FIG. 1 illustrates a gas filter unit in accordance with the invention, said unit comprising a support frame 1 and a number of filter bags 2 that are connected to the support frame. In accordance with the embodiment illustrated the filter bags are made from a pleated filter material. Each individual filter bag is formed with an opening 3 which is positioned in the area of the support frame 1 and which is delimited, in addition to by the support frame, by folds 4 made in the filter material intermediate the bags. It is of course equally possible for the support frame 1 to support one filter bag only the opening of which is then delimited entirely by the support frame. In this case the folds 4 naturally are superfluous.

The gas filter unit 1, 2 forms a cartridge which may be inserted into and removed from a ventilation duct 5 or the like. In accordance with the embodiment illustrated the filter unit 1, 2 is housed in a filter cabinet 6 forming part of the ventilation duct 5. Preferably, the filter cabinet is connected to the rest of the ventilation duct by means of interconnection flanges 7 formed at the cabinet ends. Numeral reference 8 designates guide rails extending transversally across the filter cabinet by means of which rails the support frame 1 may be inserted from one end of the filter cupboard. To make the gas filter unit accessible and to allow replacement thereof the filter cupboard is provided with an openable side hatch 9. Via this hatch it thus is easy to remove the filter unit and to insert a new one in its place in the ventilation duct.

Figure 7:
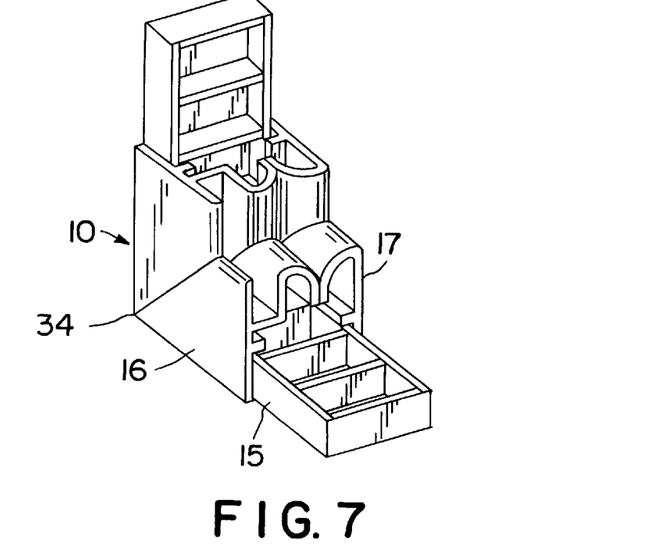
FIG. 7 illustrates the corner piece in a perspective view when in its clamping position, however, for the sake of clarity separated from the associated frame side piece and any filter bag material.
Figures 8, 8C:
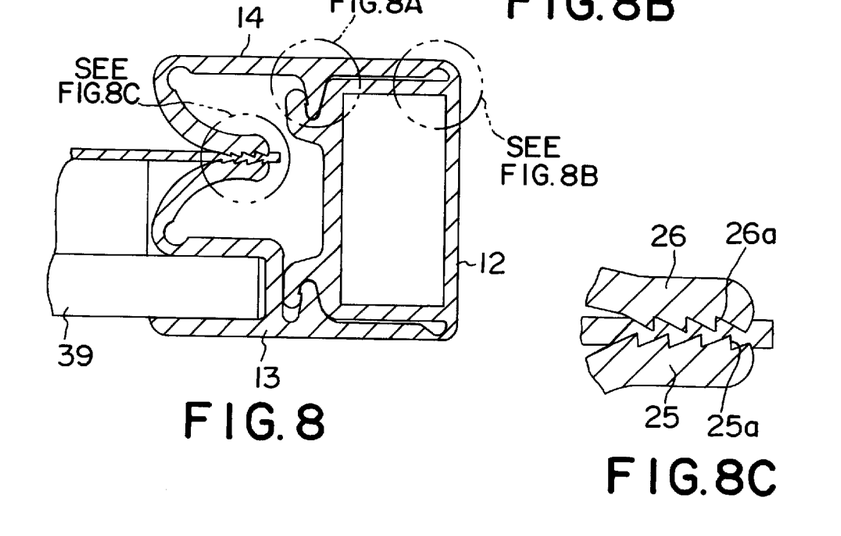
FIG. 8 is a cross-sectional view of a frame side piece in the clamping position thereof.
FIGS. 8a–8c illustrate on enlarged scale the various details forming part of the frame cross-section.
Figure 8A:
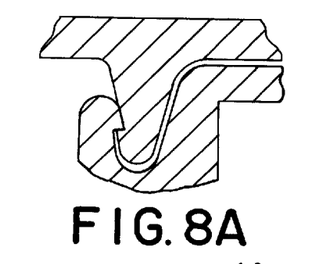
Figure 8B:
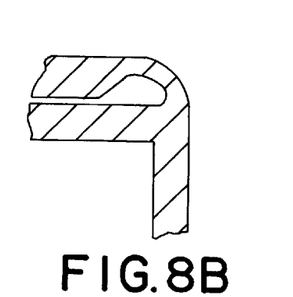

The support frame 1 has an essentially U-shaped cross-sectional configuration and the filter bag material 2 at the mouth ledge of the filter bags is inserted in the frame opening side, where it is clamped in position in the manner to be described in closer detail below. The support frame consists of corner pieces 10 bridging the frame corner angles and of frame side pieces 11 interconnecting the corner pieces. As most clearly apparent from FIG. 8 the frame side pieces have an essentially U-shaped cross-sectional configuration including a web portion 12 and adjoining side leg members 13 and 14, respectively. As most clearly apparent from FIG. 7, the corner pieces consist of a core 15, which corresponds to the web portion of the frame side pieces, and of two lateral leg members 16 and 17, respectively, interconnected with the core. In accordance with the embodiment illustrated the frame side pieces preferably are extruded profile sections configured such that the web portion 12 is interconnected with each lateral leg member 13, 14 via thinner hinge-forming areas 18 and 19, respectively. The support frame, i.e. its side pieces 11 as well as its corner pieces 10 preferably are made from a destructable or recyclable material, preferably a plastics material. The web portion 12 forms a hollow section having, as illustrated in the drawing figures, a rectangular internal circumference 20. Thus, the lateral leg members 13, 14 may be pivoted about the hinges formed by the folding indications 18, 19, from the flat unfolded position illustrated in FIG. 3 to a position, in which snap ribs 21 and 22, respectively, having a hook shaped cross-sectional configuration and positioned at distance a, b, respectively, from the hinges, inter-engage with correspondingly shaped snap ribs 23 and 24 on the web portion 12 and thus assume the position illustrated in FIG. 8. The lateral leg members are formed at their free end edges with an arcuately inwardly curved portion 25 and 26, respectively, extending the lateral leg members in such a manner that in the folded position they essentially meet while forming a nip for retaining material positioned therebetween, such as the edge portions of the filter bags as will be described more in detail below. In order to achieve satisfactory holding force the edge portions 25, 26 are provided with barb-like teeth 25a, 26a, as most clearly apparent from FIG. 8c. As appears from this drawing figure the teeth 25a, 26a in the two clamping portions 25, 26 are alternately displaced. Owing to the arrow-like or barb-like configuration of the cross-section of the snap ribs 21–24 serving as gripping rails they are comparatively easy to move into juxtaposed relationship because they slide against each other's oblique faces until they snap together as illustrated in FIG. 8. Because of the barb like interconnection they are however, more difficult to pull apart. However, the gripping portions are constructed in such a manner that the gripping force may be abolished, possibly with the aid of suitable tools, to allow the frame to be loosened from the filter bags to be destructed or recycled when the filter unit no longer is efficient.

Similarly, the corner pieces comprise a central web portion or core 27 which is formed integrally with lateral leg members 30, 31 via hinge connections 28, 29. Like the frame side pieces the web portions 27 are formed with gripping portions 35 and 36, respectively, cooperating with gripping portions 37 and 38, respectively on the lateral leg members in the folded-together position illustrated in FIG. 7. In addition, the lateral leg members are formed with inwardly curved edge portions 32, 33, the latter preferably also being provided with gripping knurls corresponding to the gripping means formed on the lateral leg members of the frame side pieces. The lateral leg members of the corner pieces form wing-like means projecting from the core 27 and formed with an oblique edge adjacent the corner 34 and with a straight-cut edge at the opposite end. 27a designates tenons projecting past the lateral leg members and the external shape of these tenons essentially corresponds to the inner profile 20 of the frame side piece web portion 12. When pivoted inwards into juxtaposed position the edge portions 32 and 33 form a nip, as illustrated in FIG. 7, designed to securely hold in position material introduced between said edge portions, as will be described in closer detail in the following. The lateral leg members on either side of the corner 34 are symmetrically shaped and have a cross-sectional configuration corresponding to the cross-sectional configuration of the frame side pieces, thus forming a continuous extension of the frame side pieces through the support frame corners. Preferably, the interconnection tenons 27a are formed with snap beads or the like, cooperating with corresponding elements formed in the frame side pieces in order to retain the corner pieces securely attached to the frame pieces in the assembled condition of the support frame. In addition, the lateral leg members 30 of the corner pieces as well as the lateral leg members 13 of the frame side pieces are provided with flanges 39 and 40, respectively, intended to form a receiving surface to support carrier beams 41, the latter extending, in the mounted condition of the gas filter unit, between oppositely positioned frame side pieces for the purpose of supporting the filter bags 2 in the folds thereof indicated in FIG. 1 by means of reference 4.

Figure 2:
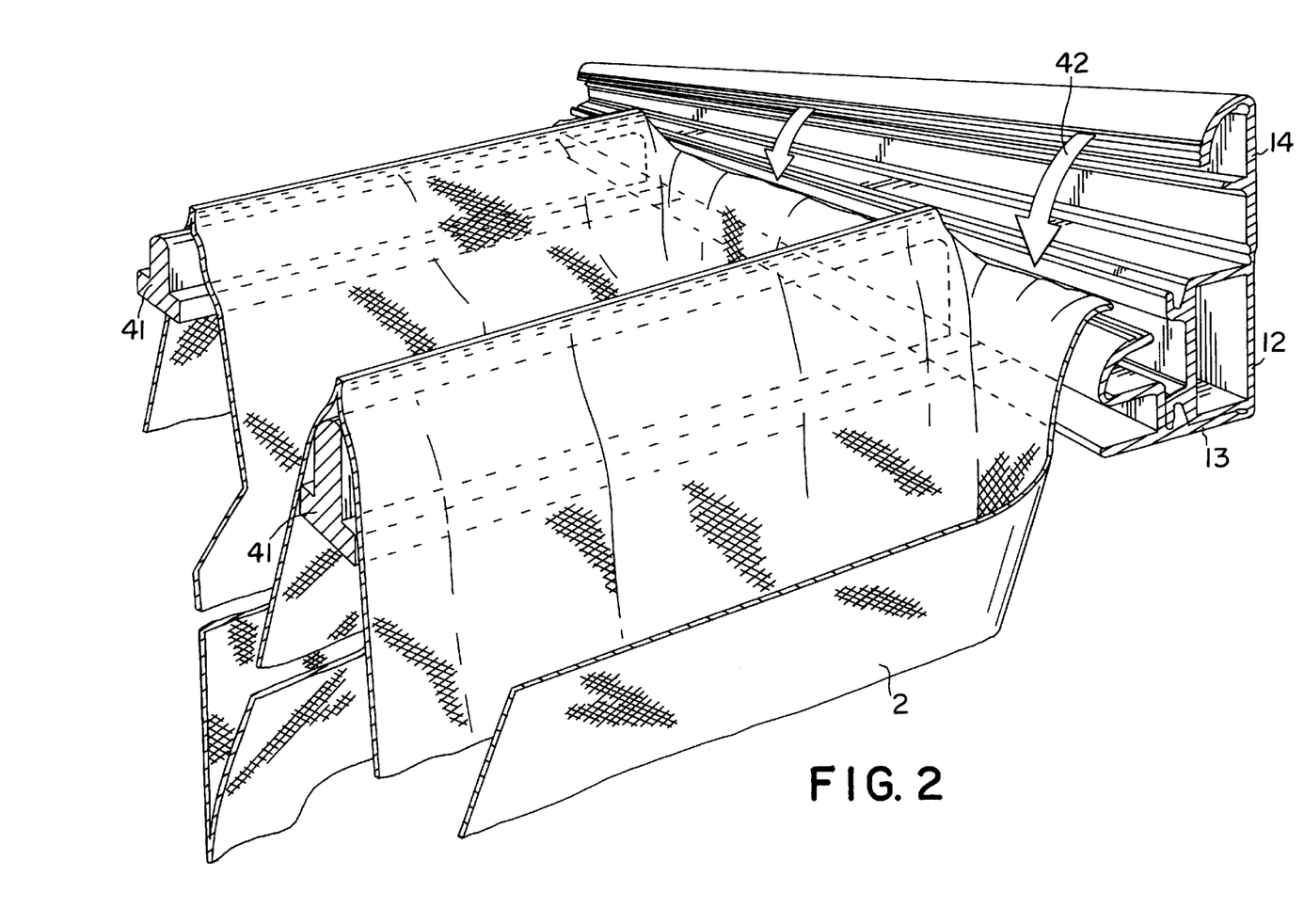
FIG. 2 illustrates in a cut part view a frame side piece included in the gas filter unit in accordance with the invention as well as the filter part associated therewith in a sequence during the assembly of said parts.
Figure 3:
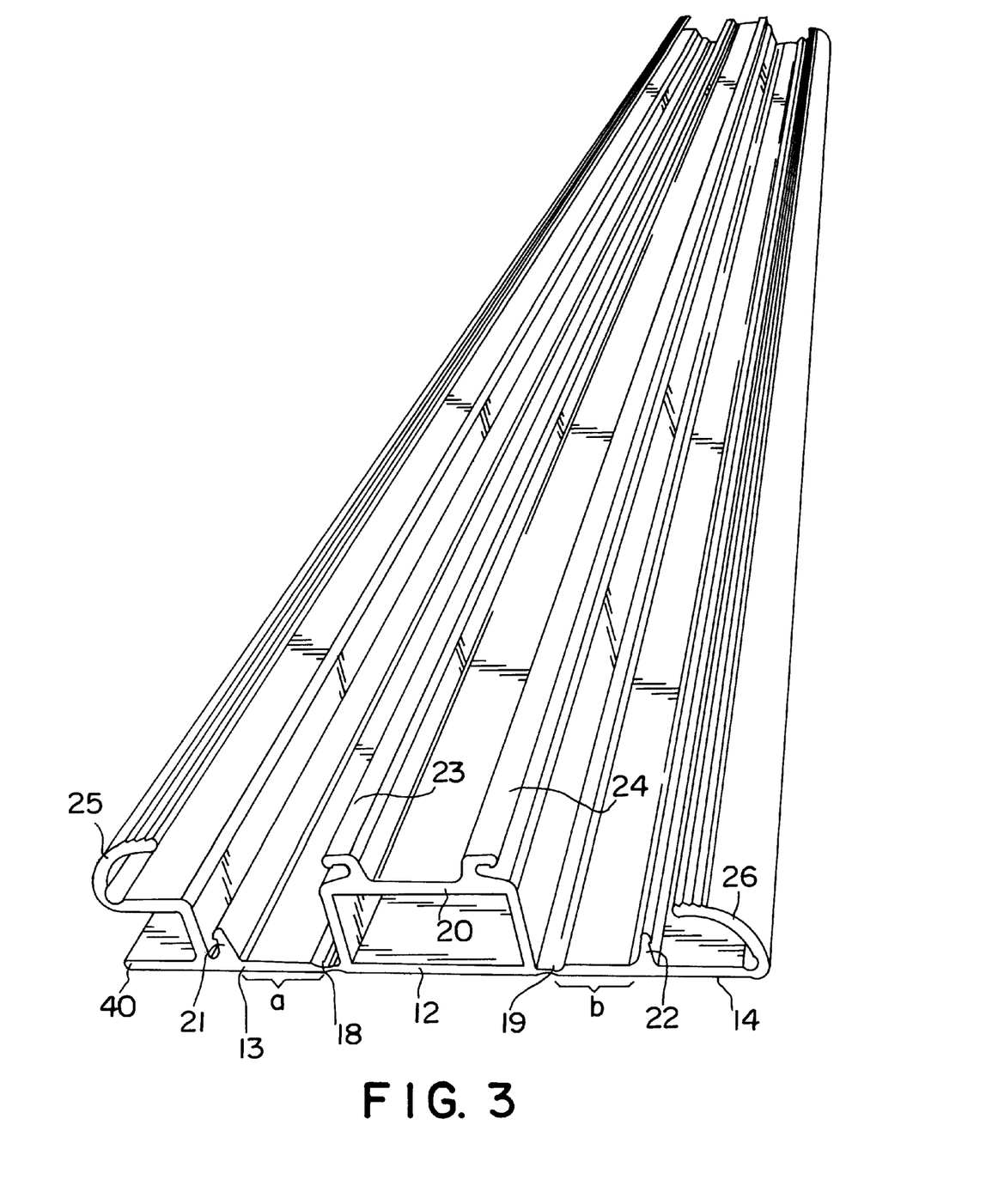
FIG. 3 illustrates a profile section which, when mounted, forms the frame side pieces of the gas filter unit.
Figure 4:
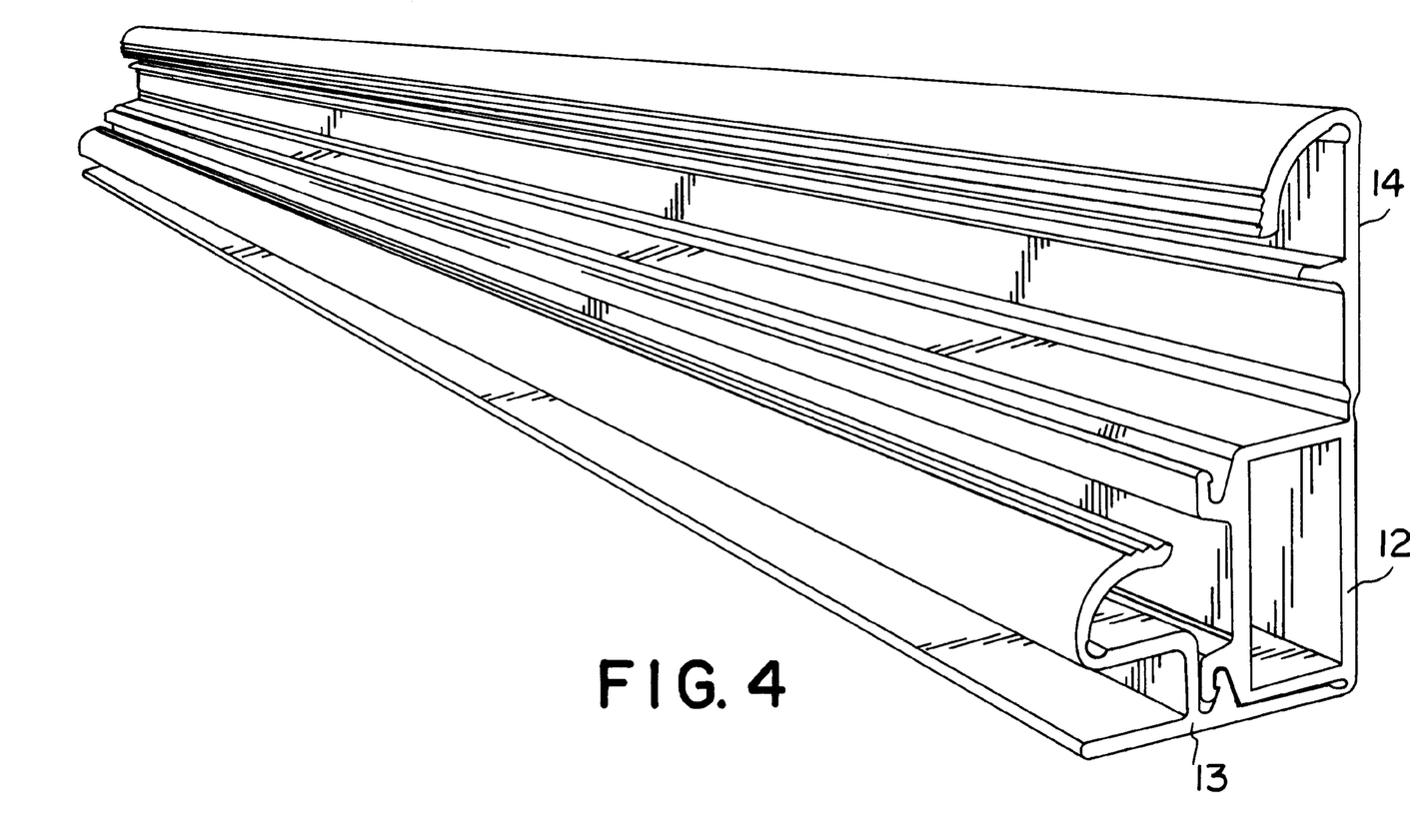
FIG. 4 illustrates the frame of FIG. 2 in the mounted position.
Figure 5:
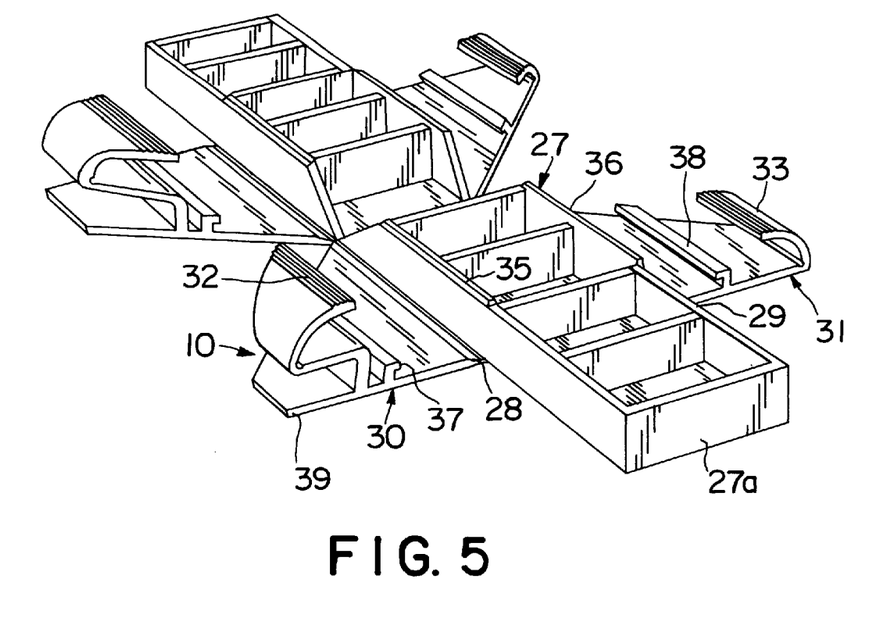
FIG. 5 is a perspective view showing the corner pieces of the frame in the unfolded position.
Figure 6:
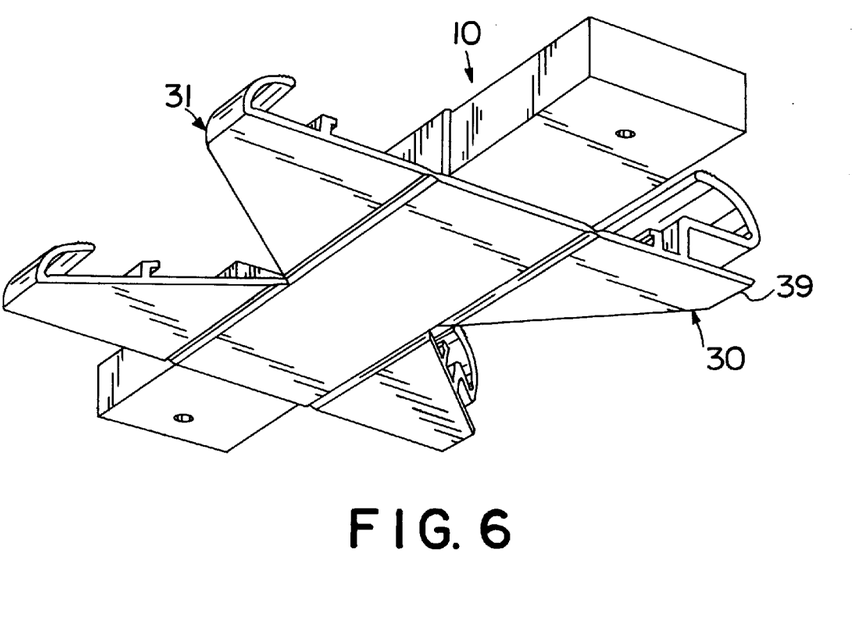
FIG. 6 is a corresponding perspective view as seen from the opposite side of the corner piece in FIG. 5.

Preferably, the frame side pieces are extruded in the comparatively flat shape indicated in FIG. 3 from a suitable plastics material. In this process, the areas indicated by a and b, respectively, in the lateral leg portions may be gripped by means of a suitable pulling means to extract the profile section through the extruder die. Owing to the comparatively symmetrically shape of the profile section the resulting expelling force will be smooth and even in relation to the extruder die. The frame side pieces are then severed to suitable lengths and are interconnected by means of the corner pieces. In FIG. 2 the lateral leg portion 13 is shown folded towards web portion 12 in which position the corresponding gripping ribs are interlocked. The filter material 2, which in accordance with the embodiment illustrated consists of a number of filter bags which are sewn together or welded together, is placed in the frame by applying the bag mouth edge on top of the gripping edge 25 of the corresponding side leg member 13. The support bars 41 which in accordance with the embodiment illustrated has a T-shaped cross-sectional configuration, are placed in position with their end portions in contact with the support flange 40 and they support the filter bag material in the area between the discrete filter bag parts. After folding the lateral leg member 14 downwards in the direction indicated by arrows 42, the marginal portion of the filter material is maintained in position, clamped in the nip formed by the lateral leg member clamping portions 25, 26, as most clearly indicated in FIG. 8 and and FIG. 8c. In the same manner, the filter material is maintained in position by the side leg members 30, 31 of the corner pieces.

The invention is not limited to the embodiment described and illustrated in the drawing figures merely as an example but could be varied as to its details within the scope of the appended claims without departing from the fundamental idea of the invention. Thus, it is within the scope of the invention to configure the frame side pieces as well as the corner pieces in such a manner that one of the lateral leg members is fixed. In this case, the frame may be given the cross-sectional shape illustrated in FIG. 2 according to which the web portion 12 would however be formed integrally with the lateral leg member 13, i.e., without any coupling means. The corresponding modification could be applied to the corner pieces, in which case for instance the lateral leg member 30 would be fixedly interconnected with the core or web portion 27 in the position illustrated in FIG. 7. Although, in accordance with the embodiment shown the coupling parts consist of snap ribs extending along the entire longitudinal extension of the profile sections it is within the scope of the invention to provide the frame side pieces, and also the corner pieces, with separate coupling means at selected points along their length. The invention is not either limited to the cavity configuration of web portion 14 illustrated. Its cross-sectional configuration could also deviate from the rectangular shape. It is likewise possible to modify the configuration of the web portion such that the locking means are supported spaced from their associated hinge 18, 19 with the aid of other means than the closed hollow section. In such cases guide flanges or other suitable means preferably are arranged to guide the corner pieces coupling tenons 27a.

Owing to the curved configuration of the edge portions 25, 26 of the lateral leg portions 13, 14 and of the corresponding portions of the corner pieces an efficient resiliency is obtained which attributes to the secure fixation of the filter material in position, independently of dimensional changes of the material in the frame, which changes may be caused for instance by the environmental effects to which the frame is exposed during service. When the filter unit is no longer usable it is removed and replaced by a new one. The old filter unit is dismantled, i.e. the lateral leg members 14 and 31, respectively, are pried open, whereupon the filter bags are loosened from the frame and from the support bars 41. The support bars and the filter frame could then either be re-used in a fresh filter unit or be destructed or re-melted to be again extruded into the desired configuration.

It is likewise within the scope of the invention to co-extrude the profile sections in different materials. For instance, the web portion could be extruded from a rigid material possessing good stability, together with lateral leg portions of a material possessing high resiliency and possibly also exhibiting a comparatively high degree of softness in the area of the gripping portions.

We claim:

1. A gas filter unit comprising:
    a filter material constructed to form at least one filter bag having a mouth;
    a support frame including a web portion and two lateral leg members in adjoining relationship therewith, said lateral leg members each having a free end edge and a fixed end edge, each of said free end edges having a clamping portion, whereas each respective clamping portion is bent so as to face the other, each clamping portion delimited by complementary teeth, at least one of said lateral leg members being hingedly interconnected with the web portion at said fixed end edge, each of said lateral leg members including a respective locking means for locking each of said lateral leg members in a clamping position against said web portion, wherein said at least one leg member is adapted to pivot into engagement with the other lateral leg member so as to lock said at least one leg member to said web portion and to lock said filter material between said teeth.

2. The gas filter unit as claimed in claim 1, wherein the at least one pivotable lateral leg member and the web portion are integrally interconnected at a hinge zone of a reduced thickness.

3. The gas filter unit according to claim 1, wherein the teeth of the clamping portions form a filter material securing nip when in the clamping position.

4. The gas filter unit as claimed in claim 1, wherein said locking means is comprised of at least one set of complementary and interlocking hooks, one of said hooks formed on the web portion and the other of said hooks formed on said at least one lateral leg, each of said hooks interengaging in the clamping position.

5. The gas filter unit as claimed in claim 1, wherein the support frame is comprised of straight frame side pieces and of corner pieces wherein the web portion is configured as a hollow section defining a cavity, and the corner pieces include a core with insertion tenons fitting into the cavity of the hollow section.

6. A gas filter unit as claimed in claim 5, wherein the frame side pieces are extruded profile sections.

7. The gas filter unit as claimed in claim 5, wherein the corner pieces are formed with flap-like lateral leg members formed integrally with and hingedly interconnected with the associated corner piece core on either side of the corner angle, which leg members, like the lateral leg members of the frame side pieces, are arranged to be pivoted inwards to assume a clamping position in which position they are retained by interacting hook means formed respectively on the lateral leg members and on the corner piece body (27) corresponding to the web portion of the frame side pieces.

8. The gas filter unit as claimed in claim 7, wherein the body and the lateral leg members of the corner pieces are configured in conformity with the cross-sectional configurations of the web portion and of the lateral leg members of the frame side pieces, respectively.

9. The gas filter unit as claimed in claim 5, wherein one lateral leg member of at least the frame side pieces is formed with a back-up shoulder on which rest filter bag support bars extending between facing frame side pieces.

10. The gas filter unit as claimed in claim 1, wherein the web portions, the lateral leg members, the hook means, the clamping means as well as the support bar back-up shoulders of the frame side pieces all are parts of the cross-sectional configuration of an extruded profile section and thus extend over the entire length of the corresponding frame side piece.

11. The gas filter element as claimed in claim 1, wherein the locking means are formed with engagement portions interacting through snap action.

12. The gas filter element as claimed in claim 11, wherein the engagement portions are designed with a hook shape adapted to ensure that the resistance of said engagement portion against pivotment of the lateral leg members of the clamping position is considerably weaker than the resistance in the opposite direction.

* * * * *